US008737694B2

(12) United States Patent
Bredehoft et al.

(10) Patent No.: US 8,737,694 B2
(45) Date of Patent: May 27, 2014

(54) ORGANIC MATTER MAPPING USING REMOTELY SENSED IMAGES

(75) Inventors: Mark Bredehoft, Willmar, MN (US); Christopher C. Dunsmore, Sacred Heart, MN (US)

(73) Assignee: Southern Minnesota Beet Sugar Cooperative, Renville, MN (US)

( * ) Notice: Subject to any disclaimer, the term of this patent is extended or adjusted under 35 U.S.C. 154(b) by 651 days.

(21) Appl. No.: 13/022,393

(22) Filed: Feb. 7, 2011

(65) Prior Publication Data

US 2012/0201415 A1 Aug. 9, 2012

(51) Int. Cl.
G06K 9/00 (2006.01)
G06K 9/62 (2006.01)
A01C 21/00 (2006.01)

(52) U.S. Cl.
USPC ............ 382/109; 382/103; 382/191; 382/224

(58) Field of Classification Search
CPC ............... G01J 3/28; G01J 3/32; G01J 3/40; G06K 9/0063; G06K 9/00651; G06K 9/00657; G06K 9/00637; G06K 2009/00644; G01N 2033/245; G01N 21/00; A01B 79/005; A01C 21/007
USPC .................. 382/109, 106, 191, 224
See application file for complete search history.

(56) References Cited

U.S. PATENT DOCUMENTS 5,044,756 A * 9/1991 Gaultney et al. ............... 356/446
6,058,351 A * 5/2000 McCauley ....................... 702/5
6,160,902 A * 12/2000 Dickson et al. ............... 382/110
7,058,197 B1 * 6/2006 McGuire et al. .............. 382/100
7,068,816 B1 * 6/2006 Knoblauch et al. ........... 382/110
7,343,867 B2 3/2008 Fraisse et al.
8,189,877 B2 * 5/2012 Asner ........................... 382/110
8,367,420 B1 * 2/2013 Sridhar et al. ................ 436/119
2001/0016053 A1 * 8/2001 Dickson et al. ............... 382/110
2003/0125877 A1 * 7/2003 Hanson ............................. 702/5
2005/0165552 A1 * 7/2005 Fraisse et al. ..................... 702/2
2011/0110580 A1 * 5/2011 Akbari et al. ................. 382/154

OTHER PUBLICATIONS

Zheng, Baojuan. Using Satellite Hyperspectral Imagery to Map Soil Organic Matter, Total Nitrogen and Total Phosphorus. MA thesis. Indiana University, 2008. Print.*

Zhong, et al. "Topographic Effects on Soil Organic Carbon in Louisiana Watersheds." Environmental Management. 43. (2009): 662-672. Print.*

(Continued)

*Primary Examiner* — Michael A Newman
(74) *Attorney, Agent, or Firm* — Dorsey & Whitney LLP; Bridget M. Hayden, Esq.

(57) ABSTRACT

Relative changes in organic matter in soil in an agricultural field are mapped by a computer-implemented system and method that uses a number of individual bands from one or more remotely sensed images of the agricultural field. Each of the bands is associated with a light spectrum wavelength range, and each of the bands is weighted based on its contribution to predicting relative changes in organic matter. Elevation data may also be used in the weighted calculation. The map is separated into zones based on the relative predicted organic matter falling within a predefined range. Each zone may be associated with a different average organic matter content, and nutrient supplements are recommended for each zone based on the average organic matter associated with each of the mapped zones.

23 Claims, 5 Drawing Sheets

(56) References Cited

OTHER PUBLICATIONS

Shields, et al. "Spectrophotometric Measurement of Soil Color and its Relationship to Moisture and Organic Matter." Can. J. Soil Sci. 48. (1968): 271-280. Print.*

Roberts, et al. "Estimation of Surface Soil Organic Matter using a Ground-based Active Sensor and Aerial Imagery." Precision Agric. (2010): 1-21. Print.*

Jarmer, et al. "Mapping Topsoil Organic Carbon of Agricultural Soils from Hyperspectral Remote Sensing Data." Proc. 'Hyperspectral 2010 Workshop'. (2010): 1-4. Print.*

Luo, et al. "Quantitative Mapping of Soil Organic Material using Field Spectrometer and Hyperspectral Remote Sensing." Int. Arch. of ISPRS. 48. (2008): 901-906. Print.*

Beck, et al. EO-1 User Guide v. 2.3. USGS: Sioux Falls: 2003.*

Luo, et al. "Quantitative Mapping of Soil Organic Material Using Field Spectrometer and Hyperspectral Remote Sensing." International Archives of the Photogrammetry, Remote Sensing and Spatial Information Sciences. XXXVII.B8 (2008): 901-906. Print.*

* cited by examiner

ORGANIC MATTER MAPPING USING REMOTELY SENSED IMAGES

FIELD OF THE INVENTION

This disclosure relates generally to a system and method for mapping relative organic matter in soil, and more specifically to weighting satellite image data to map relative organic matter in soil, which is used in determining a recommended amount of fertilizer to be applied to the soil to optimize crop production.

BACKGROUND

Over-fertilization of a vital nutrient can be as detrimental as under fertilization. Over fertilization increases input costs, may negatively impact crop quality and excess fertilizer run-off can be damaging to the environment. Under fertilization does not allow the growing crop to achieve its potential yield and quality. Organic Matter is defined as carbonaceous remains in the soil made up of organisms and organic compounds which can be mineralized into primary and secondary nutrients essential for plant growth.

SUMMARY

The present disclosure discloses systems and methods for using remotely sensed imaging data of soil, such as bare soil free of snow and growing crops, to predict the relative amount of organic matter in soil. Specific bands from the image data (e.g., bands corresponding to wavelength ranges) are correlated to organic matter represented in the image. Geographically referenced organic matter samples for the given area may also be used to predict levels of organic matter content based on the predicted presence of organic matter. Fertilization, or nitrogen, supplementation recommendations are generated based on the determination of the predicted amount of organic matter resident in the soil.

In some implementations, a computer-implemented method involves mapping relative changes in organic matter within soil in an agricultural field utilizing at least two individual bands from one or more remotely sensed images of the agricultural field using a processor unit. Each of the two individual bands is associated with a light spectrum wavelength range, and each of the bands is weighted based on a contribution the band provides to predict the relative changes in organic matter. The processor separates the mapped relative changes in organic matter according to zones. Each zone is defined according to the predicted organic matter falling within a predefined range of change, and each zone is associated with a different range of relative organic matter with respect to an adjacent zone. The processor also recommends a nutrient supplement for each zone based on the range of organic matter associated with each of the mapped zones. A memory unit stores the map of the zones of the agricultural field and the recommendation of the nutrient supplement for each zone.

In certain implementations, a computer-implemented system includes a processor unit programmed to map relative changes in organic matter within soil in an agricultural field utilizing at least two individual bands from one or more remotely sensed images of the agricultural field. The remotely sensed images are stored in a memory unit coupled to the processor unit. Each of the two individual bands is associated with a light spectrum wavelength range, and each is weighted based on a contribution the band provides to predict the relative changes in organic matter in the soil. The processor is also programmed to separate the mapped relative changes in organic matter according to zones, and each zone is defined according to the predicted organic matter falling within a predefined range of change. Each zone also is associated with a different range of relative organic matter with respect to an adjacent zone. The programmed processor recommends a nutrient supplement for each zone based on the relative organic matter associated with each of the zones. A memory unit stores the map of the zones of the agricultural field and the recommendation of the organic matter supplement for each zone.

In other implementations, a computer-implemented method maps relative organic matter in an agricultural field based on mapping changes in relative organic matter within an agricultural field utilizing at least one band from one or more remotely sensed images of the agricultural field and an elevation change of the agricultural field. Each band is associated with a light spectrum wavelength range, and each is weighted based on a contribution the band provides to predict a change in organic matter content. The elevation change of the agricultural field is weighted based on a contribution the elevation change provides to predict a change in organic matter content. The computer processor separates the relative change in organic matter within the agricultural field according to zones, where each zone is defined based on the calculated relative organic matter within the zone and is associated with a different range of relative organic matter with respect to an adjacent zone. The computer processor recommends a nutrient supplement for each zone based on the relative organic matter associated with each of the zones.

These and other features and advantages of the disclosure will become apparent to those skilled in the art from the following detailed description, wherein it is shown and described the illustrative implementations, including best modes contemplated. It is to be understood that both the foregoing general description and the following detailed description are for purposes of example and explanation, the features are capable of modifications, and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes systems, methods, and computer program products that embody various elements of the present disclosure. Those of skill in the art will understand that the described disclosure may be practiced in a variety of forms in addition to those set forth herein.

Agricultural fields generally require nutrient supplementation prior to crop planting and throughout the growing season. In order to ensure the proper amount of fertilizer is applied to a field, soil testing is performed by a laboratory to determine the organic matter and other nutrient levels naturally contained within the soil. Depending on the residual nutrients contained within the soil, the producer applies an amount of fertilizer (e.g., nitrogen, phosphorous, potassium, manure, and the like) to optimize crop production potential. For example applying the proper amount of fertilizer to a given area would optimize crop potential by: maximizing tons per acre and sugar content of sugar beets; maximizing grain yield and quality in field corn, soybeans, wheat and other cereal crops; maximizing tons per acre of sweet corn, peas, potato and vegetable crops; and maximizing tons per acre and quality of alfalfa and other forage crops. Nutrients provided in adequate amounts contribute to the health and vigor of a plant resulting in production to maximize a grower's profit potential.

Methods for determining organic matter content of soil in a given field may involve conventional methods in which one or a limited number of soil samples are tested for a given field, and fertilizer is applied to the entire field based on the information from the limited number of samples. Because a producer's field may be composed of several hundred acres, this conventional method of fertilization may not result in optimal crop production due to a consistent amount of fertilizer being applied to the field when the organic matter quantity in the soil in the large area is not necessarily consistent. That is, the organic matter content in the soil varies across a producer's field. As a result, although certain areas of the field may be adequately fertilized that have an organic matter composition consistent with the soil samples, other areas of the field with an organic matter content that is higher or lower than the determined levels may result in a low crop output or the quality of the crop may not be optimal. In addition, over-fertilization of a field commonly results in nitrogen runoff into water supplies, which can be detrimental to the environment.

Another method used in determining an amount of fertilizer to apply to a field involves a grid method in which the field is divided into a multiplicity of square blocks. Each block is generally approximately 440 feet by 440 feet. For each of the blocks, an average organic matter content is determined by taking one or more (e.g., 4 to 5) soil samples, and based on the determination, soil in each block is fertilized according to the current accepted recommendations for the respective block.

However, using the block method does not account for variations in organic matter content within the block. That is, while the block area is smaller than the entire field, and the soil in each block area is tested and fertilized according to the test results, variations in the organic matter content of the soil within this block area may be present. As a result, the crop yield or quality may not be optimized due to improper fertilization methods for portions of the block.

The present disclosure discloses systems and methods for employing a zone method in which each zone within a producer's field is defined based on a similar characteristic. More specifically, the present disclosure involves using information gathered from remotely sensed images of the agricultural field or geographical area of interest to generate zones having the common characteristic. Variations in the remote sensing imagery are used to predict variations in the characteristic of the soil, such as variations in organic matter content or relative organic matter content.

Moreover, the remote sensing imagery used in connection with determining zones for a given field or geographic area, in accordance with the present disclosure, involves the use of specific light bands (e.g., wavelength interval) for a given image of bare soil (e.g., images of soil that are free of growing crops, snow and clouds) to predict relative organic matter content. Generally, remotely sensed images (e.g., commercial satellite images such as LandSat7 images) are characterized into eight bands provided in Table 1 below.

TABLE 1

| Band Number | Wavelength interval (μm) | Spectral Range |
| --- | --- | --- |
| Band 1 | 0.45-0.52 | Blue-Green |
| Band 2 | 0.53-0.61 | Green (often mapped to Blue) |
| Band 3 | 0.63-0.69 | Red (often mapped to Green) |
| Band 4 | 0.75-0.90 | Near IR (often mapped to Red) |
| Band 5 | 1.55-1.75 | Mid-IR |
| Band 6 | 10.4-12.5 | Thermal IR |
| Band 7 | 2.09-2.35 | Short Wave IR |
| Band 8 | 0.52-0.90 | Panchromatic |

It has been found that for remotely sensed images of soil, such as bare soil, and in some instances, remotely sensed images of biomass (e.g., growing crops), considering one or more individual bands is useful in predicting relative variations in organic matter resident in the soil. This is to taking all band data into consideration in determining soil characteristics. Any band that has an influence on the ability to predict organic matter in an area of interest may be used according to this disclosure. For example, image bands that may be useful in predicting relative organic matter are in the infrared region (e.g., bands 4-7), but color bands 1-3 may also provide useful information.

According to the present disclosure, historical remotely sensed imagery as well as current remotely sensed imagery, and the bands contained therein, may be consulted, and one or more (e.g., two or more, three or more, four or more, five or more, and so on) bands in the infrared region or otherwise may be used in predicting relative organic matter in soil. Image bands from certain periods of time may also be more or less useful in predicting relative organic matter than the same band from another period of time. For example, remotely sensed images for an area may be available on an annual, quarterly, or monthly basis, and for images of bare soil, for example, any current or historical remotely sensed images may be consulted.

Moreover, it has been found that one band from a remotely sensed image may be more useful in predicting relative organic matter compared to another band. These individual bands may be from the same or from a different remotely sensed image. However, even bands that may be less relevant than others in their ability (e.g., relative contribution) to predict relative organic matter, may nonetheless play a role in predicting relative organic matter in soil.

Therefore, the present disclosure provides a system and method in which image band data is weighted based on its contribution to predicting relative organic matter, e.g., predicting the organic matter change in soil from one area to another. This contribution or influence the image band has in predicting relative organic matter may be based on the individual band alone, or may be based on the band's relevance in relation to other bands used in a prediction equation. Thus, one or multiple individual image bands may be used in the prediction model. When more than one image band is used, the relative weights assigned to the separate image bands may be the same or different. In addition, where multiple bands are used in the prediction model, the bands may be from the same remotely sensed image or from different remotely sensed images, e.g., the bands may be from one or more historical remotely sensed images or a current remotely sensed image. Where multiple bands are used from different images, the same or a different band may be used in the weighted calculation.

Prediction models include assigned weights for each image band used in the calculation. The assigned weight corresponds to the band's ability or contribution in predicting relative organic matter for a given data, as well as changes in relative organic matter for a data set associated with the image band. The prediction models may involve the use of a regression model that analyzes a number of variables in relation to the remotely sensed images. The predictions model and/or regression model assigns relative weights to the image band and weights the image band data, e.g. pixel values, light spectrum wavelength values, image reflectance values within bands, to correlate the image data to the relative changes in organic matter. For example, for an image of an agricultural field, the image is composed of multiple pixels, and each pixel is associated with a given image band. Thus the pixel may have an assigned wavelength value, and the prediction model may perform a weighted calculation for the wavelength value and assign the pixel a predicted organic matter number (which, as described below, may or may not be associated with organic matter content).

$$\text{predicted organic matter} = -12.24 - ((0.13 * \text{pixel value } IR \text{ band 5 image 1}) + (0.14 * \text{pixel value } IR \text{ band 7 image 1}) - (0.06 * \text{pixel value band 7 image 2}))$$

Where the "pixel value IR band 5 image 1" is a wavelength value within the band 5 infrared region for a first remotely sensed image, the "pixel value IR band 7 image 1" is a wavelength value within the band 7 infrared region for the first remotely sensed image, the "pixel value IR band 7 image 2" is a wavelength value within the band 7 infrared region for a second remotely sensed image, and the numbers preceding the values are the relative weights assigned to the elevation and band data for the weighted prediction equation.

It will be understood that while pixel values may be used in the prediction models, other data from the remotely sensed images may also be used such as light spectrum wavelength values, image reflectance values, and the like in order to correlate relative changes in organic matter.

Based on the weighted calculation of the image data, e.g., the pixel data, the area of interest contained within the remotely sensed image is mapped to according to the changes. For each weighted calculation, the image data used in the calculation is also used to correlate the calculation back to the remotely sensed image, and thus to the agricultural field. The mapped area is broken down into multiple zones, and each zone is associated with a range of or relative amount of organic matter (e.g., each zone is associated with a change in organic matter in the soil from one area to another). When the image variation, and therefore the weighted calculation predicting relative organic matter content, reaches a predetermined threshold (e.g., 1-2% change, 1-3% change, 2-3% change, and the like), a zone border is defined. Accordingly, the present disclosure provides advantages over the grid and conventional methods because the zone borders are defined based on the weighted changes in the predicted relative organic matter for image band data, as opposed to arbitrarily defined block lines forming a grid, for example. Thus, each zone may be individually managed based on the predicted changes in organic matter contained within each zone. Therefore, it will be appreciated that zones may take any size or shape as the zone area is defined by zone borders corresponding to changes in the field's characteristics, e.g., relative organic matter. It will also be appreciated that each zone type, e.g., zone number or zone identifier will border other zone types (See FIGS. 1C and 1D).

While the zones mapped provide information on the relative changes in organic matter within the soil in the area of interest, the actual level of organic matter within each zone typically requires verification or confirmation. According to this disclosure, the corresponding level of organic matter within each zone mapped may be determined based on an analysis of the soil within each zone. For example, historical data from soil tests within each zone may be used to predict levels of organic matter content. In addition or alternatively, the soil within each zone may be tested to determine an organic matter content within the zone, e.g., in a "ground truthing" process, which may involve testing soil from each zone, such as soil from the zone boundary, to confirm organic matter content, as well as to confirm the zones have been accurately mapped for purposes of fertilization (e.g., nitrogen supplementation). The zone may thus be fertilized based on the amount of organic matter determined to be within the zone, thereby optimizing crop output. Alternatively, where an average organic matter content is known for a geographical area and previously recorded, e.g., a number of soil samples were previously tested and stored in a memory unit, zoning of the geographical area may involve assigning an average organic matter content to a zone based on the previously recorded information.

Additional variables taken into consideration in the prediction model may include elevation data for the geographical area of interest. Generally, changes in relative elevation results in relative changes in organic matter, and a lower elevation may be indicative of a higher relative organic matter content compared to a higher elevation. Thus, for example, data from the national elevation dataset (NED) or data from the NED may be consulted and used in the prediction model. Thus, like the image band data, elevation data may also be weighted based on the contribution the elevation of the agricultural field provides in predicting relative changes in organic matter. For the remotely sensed image, an elevation may be associated with each pixel, and the prediction model may perform a weighted calculation for the elevation and assign the pixel a predicted organic matter number based thereon.

Figure 1A:
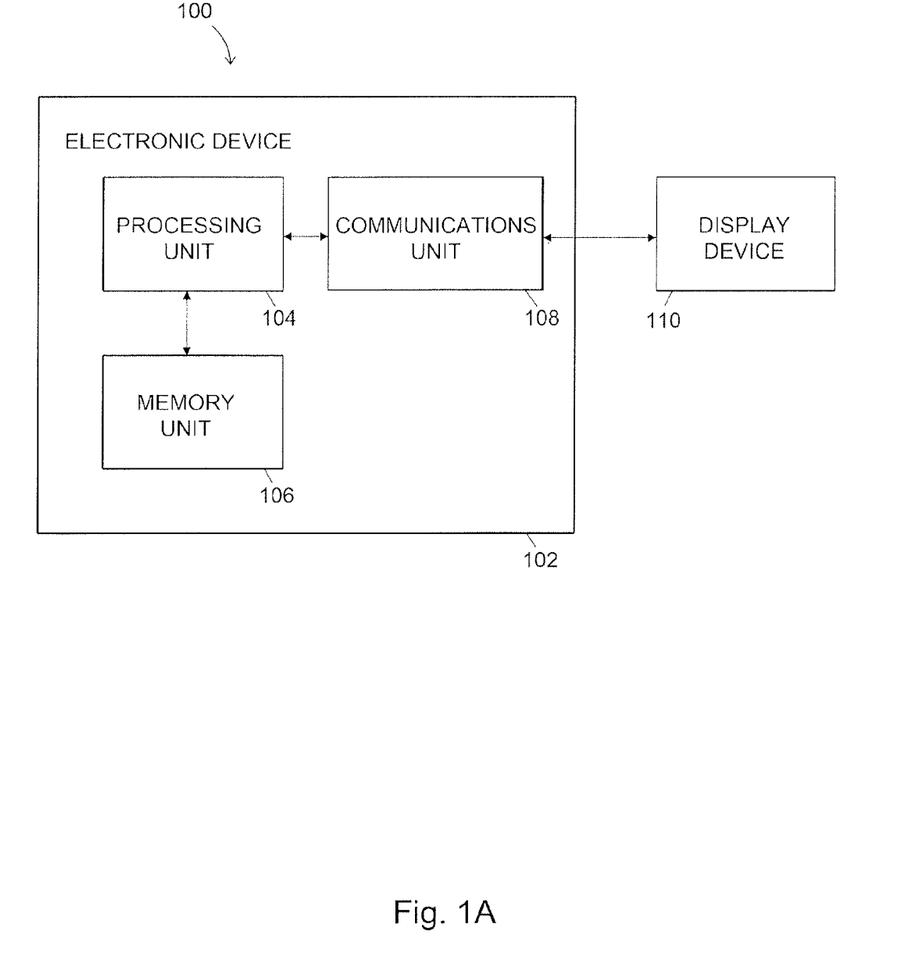
FIG. 1A is a block diagram illustrating a system for predicting relative changes in organic matter in soil based on weighted remote sensing imagery data (e.g., data from satellite images, aerial images, ground images and the like).

Turning to the figures, FIG. 1A is a block diagram illustrating a system 100 for predicting relative changes in organic matter in soil based on weighted remotely sensed image data. The system 100 includes an electronic device 102, which may be a computer such as a personal computer having hardware and software programmed thereon, and may be a network of computers communicatively coupled by Internet, intranet and combinations thereof. The electronic device may include one or more processing units 104 (such as a computer processor) for executing instructions stored in one or more memory units 106 (such as non-transitory storage media; a magnetic storage medium; optical storage medium; magneto-optical storage medium; read only memory; random access memory; erasable programmable memory; flash memory; and so on) for predicting relative changes in organic matter in soil based on weighted remotely sensed image data. The information generated by the processing units 104 may be sent by a communications unit 108 (such as a modem, and I/O connection, a cable, a wireless connection and the like) for display on a display device 110 (such as a computer display, computer monitor, mobile phone, mobile computing device or any suitable display device for displaying images and/or text) or the communications unit 108 may send the information to another database, electronic device (e.g., computer) or other component within the system 100 for additional processing.

The processing units 104 may execute instructions stored in the storage units 106 for predicting relative changes in organic matter in a geographical area of interest. Prediction models or equations executed by the processing units 104 weight image band data for one or multiple bands, and changes in organic matter for the geographical area of interest is predicted. For example, each pixel of the remotely sensed image in the area of interest may have an assigned wavelength falling within the image band, and the processing unit 104 may calculate a predicted relative organic matter value for the pixel by weighting the pixel's assigned wavelength according to the contribution the image band provides in the prediction equation. The contribution may be reflected as a percentage value, e.g., a value greater than 1 percent. The weighted calculation predicting relative organic matter values may be performed for each pixel.

The processing units 104 may also generate a map (See FIGS. 1C and 1D) based on the predicted relative organic matter values for the area of interest. Continuing with the example of the remotely sensed image pixels above, the mapped area may be composed of calculated predicted relative organic matter values for each of the weighted pixels, the map may be broken down into zones as the value of the weighted pixels reaches a predefined threshold (e.g., 0.5, 1.0, 1.5, 2.0 percent change). At the predefined threshold, zone boundaries are defined. Thus, the zones of differing relative organic matter are based on the variations in the weighted image data. Instructions may also be executed by the processing units 104 for mapping or overlaying property boundaries and geographical features indicative of non-tillable or non-farmable areas.

In connection with the processing units 104 predicting and mapping relative organic matter, the storage units 106 may store current and historical remotely sensed image data and band data for the various images. The image data may be stored as, or converted into values, such as pixel values, wavelength values, and the like. The storage units 106 may store equations for calculating a predicted relative organic matter content based on the image band data. The equations may be based on a regression model that analyzes a number of variables in relation to the remotely sensed images as described above.

The storage units 106 may also store geographically referenced soil test information for geographic areas of interest. The soil test information may be historical information, which may be periodically updated with new tests for the area of interest. Updates to the geographically referenced soil test data may update historical data, or may provide soil test data for new, previously unrecorded geographical areas. The data stored by the storage units 106 may additionally include mapping information denoting property boundaries and non-viable land for the areas of interest. Both the soil test information and the mapping information may be accessed by the processing units 104 for providing organic matter content within soil and for providing additional mapping functions.

The communications unit 108 may receive data from the processing unit 102 for transmitting to the display unit 110. At the display unit 110, the data displayed may be a prediction of the relative organic matter content for the geographical area of interest. Such information may be a relative numerical value, such as an average value of predicted organic matter within the soil contained within the zone, or the predicted amount of fertilizer required to maximize yield of a given crop within the zone.

Figure 1B:
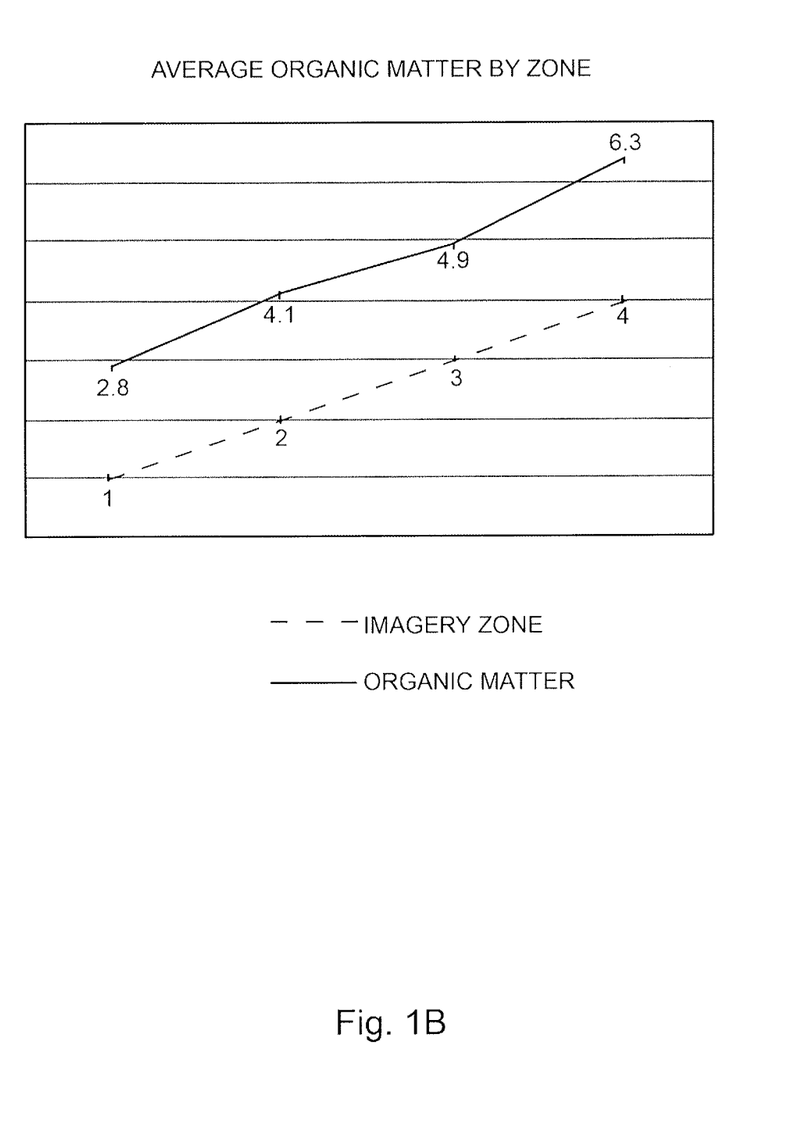
FIG. 1B depicts a graphical output resulting from a prediction model including weighted remote sensing imagery data variables. The graphical output may be the result of using the system of FIG. 1A.

FIG. 1B depicts a graphical output of a prediction model that includes weighted remotely sensed image data variables. The graphical output may be the result of using the system 100 of FIG. 1A. In FIG. 1B, for an agricultural field (or other geographical area of interest), soil having a predicted average organic matter of 2.8% (+/−∼1.0%) is classified as zone 1 soil, soil having a predicted average organic matter of 4.1% (+/−∼0.5%) is classified as zone 2 soil, soil having a predicted average organic matter of 4.9% (+/−∼0.5%) is classified as zone 3 soil, and soil having a predicted average organic matter of 6.3% (+/−∼1.0%) is classified as zone 4 soil. Accordingly, fertilization (e.g., nitrogen) recommendations for each of the zones may be provided for crop optimization. It will be appreciated that the zone classifications and associated predicted average organic matter are based on fertilization requirements for optimizing crops and thus zones may be classified based on any range of predicted average organic matter for a given area where a fertilization recommendation (e.g. 100 lbs of nitrogen per acre) will enable the soil to produce an optimized crop.

Figure 1C:
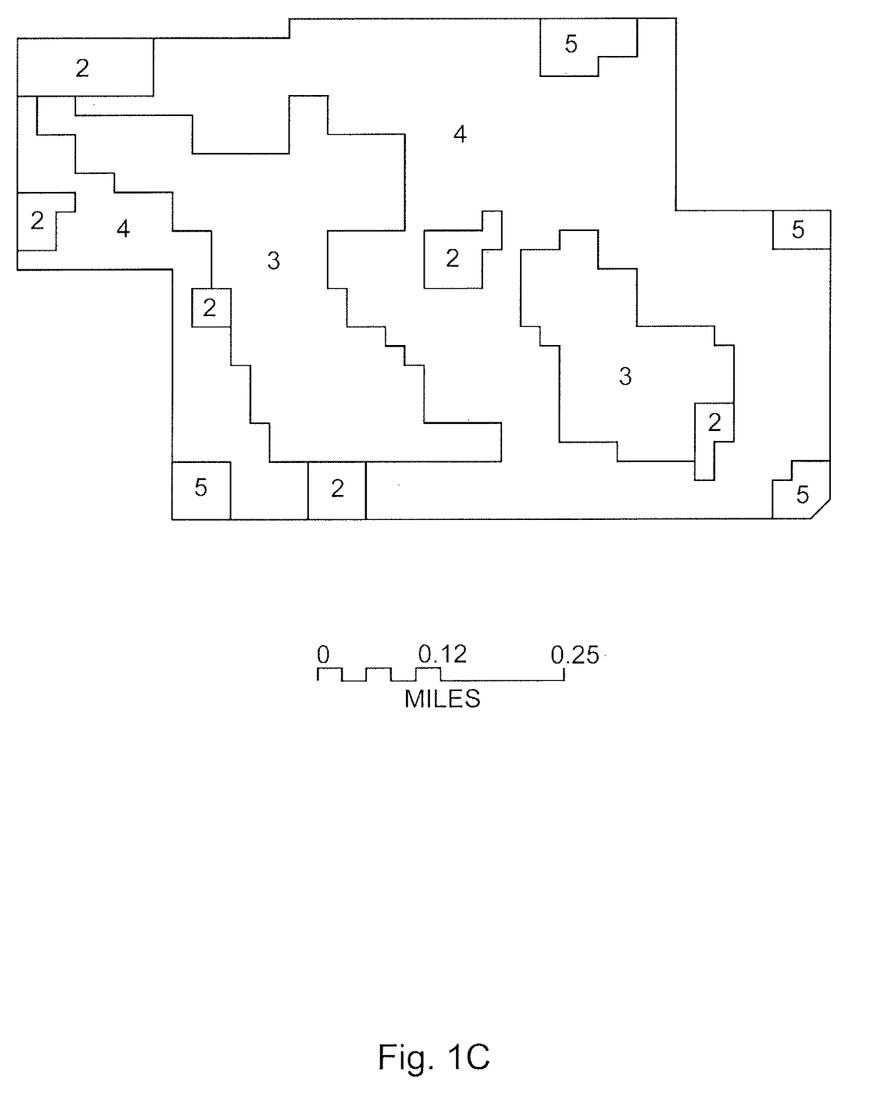
FIG. 1C depicts a map of an agricultural field broken down into zones having been determined by performing weighted calculations of remote sensing imagery band data. The map may be displayed using the system of FIG. 1A.

In addition or as an alternative to displaying the graph of average organic matter by zone, a representation of the area of interest may be displayed, and zone boundaries may be denoted based on changes in predicted average organic matter by zone. Accordingly, FIG. 1C depicts a map of an agricultural field broken down into zones having been determined by performing weighted calculations of remotely sensed image band data according to the present disclosure. The map may be displayed using the system 100 of FIG. 1A. Each type of zone (e.g., zone 2, zone 3, zone 4 and zone 5) is associated with an average organic matter (e.g., a percentage range of organic matter within the soil) that is different from each other zone type. Although in FIG. 1C, the numbers are reflective of a change in soil from one zoned area to another, not an average organic matter value. The average organic matter within each numbered zone is associated with requiring a specific amount of fertilizer per acre, e.g., a recommended amount of fertilizer. According to FIG. 1C, the zone with a lower number, e.g., 2, requires more fertilizer per acre (e.g., 120 lbs per acre) due to its relatively lower average organic matter level (e.g., 0-3%) compared to the zone with the higher number, e.g., 5, which requires less fertilizer per acre (e.g., 90 lbs per acre) due to its relatively higher average organic matter level (e.g., 5-7%). As will be appreciated from FIG. 1C, each zone identified with the number 2 requires the same amount of fertilizer per acre (e.g., 120 lbs per acre), each zone identified with the number 3 requires the same amount of fertilizer per acre (e.g., 110 lbs per acre) but may be less than the amount required for a zone identified with the number 2, and so on for the zones identified with the number 4 and 5 (e.g., 100 lbs per acre, and 90 lbs per acre, respectively). However, the recommended amount of fertilizer may be equal to, more, or less from one zone to another depending on the range of change in organic matter level from zone to zone. For example, where the range of change in organic matter from one zone to another is slight (e.g., 0.25% to 0.5% change from one zone to another), then the recommended amount of fertilizer may be the same for each zone. It will further be appreciated that zoned maps may be broken down into more or less than four types of zones, thus allowing recommended fertilizer amounts per acre to differ according to zone. Moreover, it will also be appreciated that in cases where a zone number is associated with a high average amount of organic matter naturally in the soil, the zone may not require fertilization. For example, where a zone is associated with an average organic matter content of greater than 7%, the zone may not require nitrogen supplementation in order to optimize crops. Therefore the recommendation may be 0 lbs per acre for this type of zone. However, the requirements for an amount of nitrogen supplementation for a given zone may vary based on the type of crop being planted, the type of crop previously planted, whether the previous crop was completely removed from the agricultural field (e.g., corn crops for ethanol production) and so on. Thus, it will be appreciated that the foregoing are examples of zones having an average organic matter levels and their corresponding recommended nitrogen supplements, and these should not be construed as limiting.

Figure 1D:
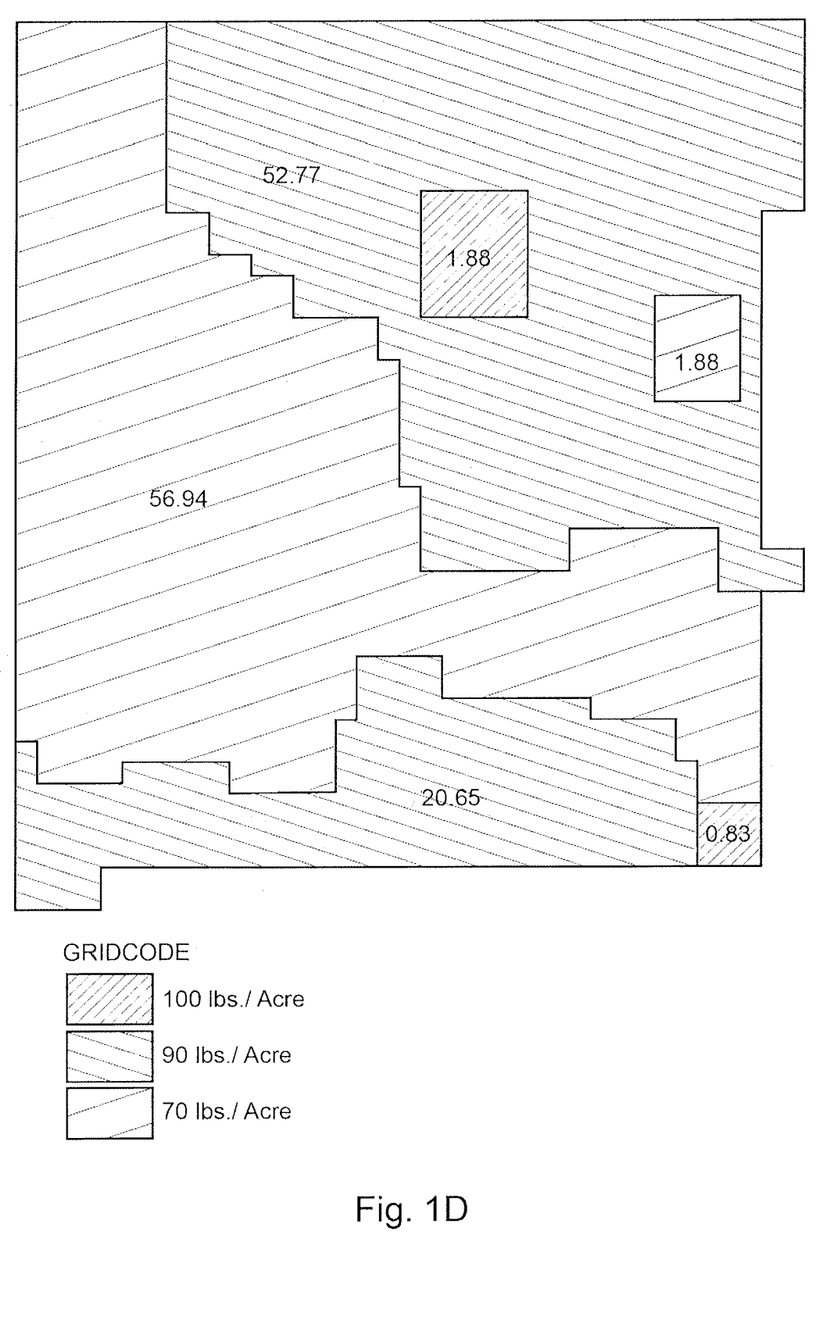
FIG. 1D depicts another map of an agricultural field broken down into zones determined by performing calculations of weighted remote sensing imagery band data according to the present disclosure. The map may be displayed using the system of FIG. 1A.

FIG. 1D depicts another map of an agricultural field broken down into zones determined by performing calculations of weighted image band data according to the present disclosure. The map may be displayed using the system 100 of FIG. 1A. Rather than identifying each zone with a zone number classification, e.g., zones 2-5 like in FIG. 1C, the zones in FIG. 1D are coded using different types of shading, and each shading is associated with a different recommended fertilizer amount per acre. In addition, each number within the zone corresponds to the acreage within the zoned area. Thus, in FIG. 1D, for the zone with 20.65 acres with the type of shading that means that 90 lbs fertilizer per acre is recommended, the operator fertilizing this zone knows that the zone will require 1,859 lbs of fertilizer.

In addition to the map images described above, when the display unit 110 displays more geographical areas than an agricultural field of interest, an overlay of property boundary lines may be displayed, In addition, areas of non-viable land may be marked. The mapped areas may also be numbered and/or coded (e.g., color coded, shaded, marked) by zone as described above, and for each zone, the zone number (i.e., an arbitrary number indicating a change from soil in one zone to another), the average organic matter within the zone and/or recommended fertilizer supplement amount may be assigned to each zone. This information may be provided within the zones drawn on the map and/or may be provided using a zone code key (e.g. a Gridcode in FIG. 1D). The zone boundaries may also be marked so that the user is able to discern the zoned areas as well as the zone boundaries. In addition, each zone may have an acreage (FIG. 1D) associated therewith so that the user can calculate the amount of fertilizer to be used for the area within the zone. The mapped zones are generally in the form of block-shaped or stepped-shaped zones having both rectangular, square (e.g., regular) and irregular shapes. The zone borders, and the shape of the borders (e.g., stepped or smooth borders) are based on the remotely sensed image data available for a given area. For example, the border resolution may be based on an image block corresponding to a 14.25 meter block (14.25 m length on one side). In some cases, 0.5 meter resolution is available. Nonetheless, by defining the zone borders based on a change in the average organic matter within the zone, the zone may be fertilized according to growing requirements to a high degree of accuracy and precision.

Further, the data generated, stored and displayed by the system 100 may involve the use of information related to the elevation and/or changes in elevation of the geographical area of interest. The elevation data may be used by the processing units 104 as a factor in the zone mapping. As explained above, each pixel in the remotely sensed image may be associated with an elevation, and the weighted calculation may additionally weight the elevation associated with the pixel in predicting the relative organic matter for the soil associated with the pixel. Such a prediction calculation may be:

$$\text{predicted organic matter} = -12.24 + ((0.08 * \text{pixel elevation}) - (0.13 * \text{pixel value IR band 5 image 1}) + (0.14 * \text{pixel value IR band 7 image 1}) - (0.06 * \text{pixel value band 7 image 2}))$$

Where the "pixel elevation" is the elevation of the land associated with the pixel, the "pixel value IR band 5 image 1" is a wavelength value within the band 5 infrared region for a first remotely sensed image, the "pixel value IR band 7 image 1" is a wavelength value within the band 7 infrared region for the first remotely sensed image, the "pixel value IR band 7 image 2" is a wavelength value within the band 7 infrared region for a second remotely sensed image, and the numbers preceding the values are the relative weights assigned to the elevation and band data for the weighted prediction equation.

While the weights assigned to the elevation and band data range between 6 percent and 14 percent, the assigned weights may fall within a number ranges. For example, each weighted variable may account for between 1 and 10 percent, 5 and 10 percent, 5 and 20 percent, 1 and 15 percent, 1 and 20 percent, 10 and 15 percent, 10 and 20 percent of the calculation, up to 50 percent of the calculation, up to 75 percent. Elevation may or may not be a weighted factor in the prediction equation. In addition, more or less than three separate image bands may be factored into the weighted equation.

In view of the above example, the image displayed related to the mapped zone may implicitly include data relating to the elevation. However, even where the zone is mapped using to elevation data in the prediction calculation, the mapped area may nonetheless include topographical elevation indicators, e.g., topographical lines.

Further, slope changes in elevation, e.g., the degree of change in elevation for a given area, may be useful in predicting quick transitions from one zone to another zone as well as zone boundaries. Therefore, slope change data may also be used in connection with system 100 to predict and map relative organic matter.

Figure 2:
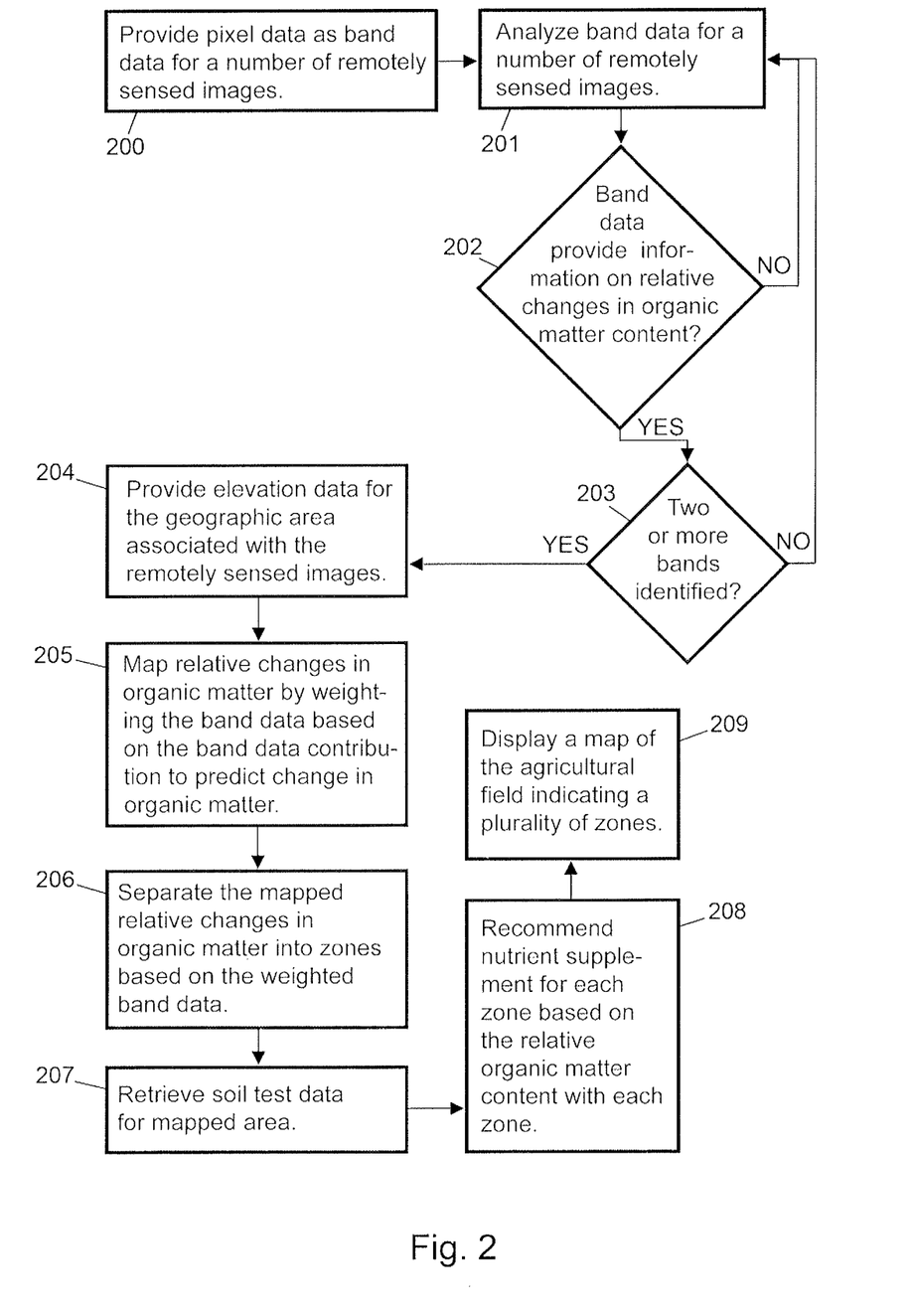
FIG. 2 is a flow chart illustrating a method for predicting relative changes in organic matter in soil based on weighted remotely sensed image data. This method may be performed by the system of FIG. 1A.

FIG. 2 illustrates a method 200 for predicting relative organic matter content in soil based on weighted remotely sensed image data. The method 200 may be performed by the electronic device 102 of FIG. 1. The flow optionally begins at block 200, where remote sensed image band data is provided in the form of pixel data for the band. In this case, the processing unit 104 analyzes individual pixels for the band data associated with the remotely sensed image, e.g., the remotely sensed image of the agricultural field. As described above, because the pixel data for each pixel includes a numerical value such as a wavelength value, the numerical value may be used in the weighted calculation at block 204. Otherwise, the flow begins at block 201 in which band data for a number of remotely sensed images is analyzed by processing unit 104, and proceeds to block 202 where a determination of whether the band data (e.g., reflectance data) provides information on relative changes in organic matter for the geographical area depicted in the image. If not, the flow proceeds back to block 201 to continue the analysis of the image band data. If the band data is relevant to identifying relative changes in organic matter of the soil, the flow proceeds to block 203 where the processing unit 104 determines whether two or more bands providing information of relative changes in organic matter have been located. Otherwise, the flow proceeds to block 201 until two or more bands have been located. Optionally, by way of block 204, the flow may additionally provide elevation data for the geographic area associated with the remotely sensed image for use in the weighted calculation. As described above, the elevation data may also be weighted based on the contribution the elevation of the agricultural field provides in predicting relative changes in organic matter. For the remotely sensed image, an elevation may be associated with each pixel, and the prediction model may perform a weighted calculation for the elevation and assign the pixel a predicted organic matter number based at least partially on the elevation data.

Upon locating two or more bands, the flow then proceeds to block 205 where the processing unit 104 maps the relative changes in organic matter by weighting the band data based on the band's contribution to predicting change in organic matter in the imaged soil (e.g., weighted band data is correlated with the portion of the image where each pixel is located in the image). The flow then proceeds to block 206 where the mapped relative changes in organic matter are separated into zones based on the weighted band data for the area of interest. Optionally, the flow proceeds to block 207 in which soil test data for the mapped area is retrieved by the processing unit 104. The flow proceeds to block 208 where an nutrient supplement (e.g., fertilizer) is recommended for each zone based on the relative organic matter and/or actual organic matter within each zone. After or concurrently with recommending the organic matter supplement at block 208, the flow may optionally proceed to block 209 in which the display unit 110 displays a map of the agricultural field, region, area of interest, and the like, broken down into zones based on the relative organic matter contained within the zone.

Embodiments of Use

The following test results are based on a comparison of crop fertility for conventional, grid-based and zone-based practices. The zone-based practices were based on predicted relative organic matter across different zones in which the different zones were mapped using weighted remotely sensed image band information. The crops tested were sugar beets, but it will be understood the methodology described herein is applicable to any number of crop types.

Seven fields were involved in the study. Each field was mapped into zones 1-5 based on calculating average organic matter in each zone. A minimum of one sample for every two acres within a zone was collected. The adjusted nitrogen is shown in Table 2.

TABLE 2

| Zone | Organic Matter | Adjusted Nitrogen |
|---|---|---|
| 1 | <3% | 120 |
| 2 | 3.1-4% | 110 |
| 3 | 4.1-5% | 100 |
| 4 | 5.1-7% | 90 |
| 5 | >7% | 70 |

In each field two 140 foot wide by 440 feet long test strips were installed, one for each of the conventional and grid-based methods. At harvest, two adjacent ten foot beet samples were collected from multiple points within each zone and each conventional and grid-based test strips. 406 individual samples were collected from the seven fields. Each sample was weighed and analyzed for quality in a lab.

Results and Discussion:

Table 3 below shows statistics for crop yields grown using zones, grid and conventional methods. Average sample results for each zone are shown. Statistical analysis for variance (Pr>F) among variables measured was conducted at the alpha 0.05 level of confidence. The Pr>F uses a statistical value to explain the difference in variables measured within the zones. A value of 0.00-0.05 means the difference in the variables measured across the zones are highly significant. A value of 0.05-0.10 means the difference in the variables measured are moderately significant. A value of 0.10 and greater means the differences in variables measured are not significantly different.

Table 3 shows variations in organic matter and residual nitrogen are taken into account and adjustments are made for each area. Averaging data over the soil changes (zones) within each nitrogen management technique shows that there is an advantage to the use of zone management compared to grid and conventional. Overall increase in beet quality is the greatest advantage as depicted in Table 3. An increase in tons has not been realized.

TABLE 3

|  |  | Residual N | Sugar | PURITY | Tons | Nitrate | Extsucton | Extsucacre | Revenue | Net Revenue |
|---|---|---|---|---|---|---|---|---|---|---|
| Zone | Pr > F |  | 0.003 | 0.053 | 0.077 | 0.003 | 0.010 | 0.055 | 0.031 | 0.057 |
|  | Mean | 121 | 15.4 | 91.9 | 26.0 | 15 | 264 | 6862 | $799.65 | $760.14 |
| Grid | Pr > F |  | 0.075 | 0.031 | 0.003 | 0.003 | 0.077 | 0.004 | 0.006 | 0.0056 |
|  | Mean | 48 | 15.4 | 91.5 | 25.9 | 13 | 262 | 6787 | $785.84 | $745.72 |
| Conventional | Pr > F |  | 0.006 | 0.304 | 0.014 | 0.0001 | 0.008 | 0.006 | 0.003 | 0.003 |
|  | Mean | 48 | 15.3 | 91.4 | 26.0 | 11 | 260 | 6765 | $776.48 | $754.80 | matter using satellite images (LandSat7) having weighted bands and elevation data information. Each field was soil sampled to a four foot depth and nitrogen (e.g., fertilizer) was adjusted and applied to the zone based on the average organic For averages of organic matter zones averaging over 7.0% organic matter were omitted from all tests. In the zone test, nitrogen fertilizer was not applied to that zone as the recommendation did not warrant addition of nitrogen. In those areas the test did not apply because there was no control of total nitrogen. Averages for all fields minus the aforementioned zone is shown in Table 4, where EST is extractable sucrose per ton, ESA is extractable sucrose per acre.

TABLE 4

|  | Sugar | Purity | Tons | Nitrate | EST | ESA | Revenue | Net Revenue |
|---|---|---|---|---|---|---|---|---|
| Zone | 15.4 | 91.9 | 26.0 | 15 | 264 | 6862 | $799.65 | $760.14 |
| Grid | 15.4 | 91.5 | 25.9 | 13 | 262 | 6787 | $785.84 | $745.72 |
| Conventional | 15.3 | 91.4 | 26.0 | 11 | 260 | 6765 | $776.48 | $754.80 |

The testing showed there was an advantage using zone nitrogen application to both sugar beet quality and revenue.

In another embodiment of use, a field may be mapped into zones multiple times over the course of time. Again, the zones are based on calculating average organic matter using at least weighted remotely sensed image band information and classifying the field into zones based on the average organic matter falling within a specified range associated with a particular zone. The additional mapping of zones for the same field may be analyzed for changes in the size and shape of the mapped zones. This change, or lack thereof, in the zone indicates whether the relative organic matter content within the field changes from one time to another. As a result, the user may determine whether the relative amount of fertilizer applied across the field changes or remains substantially the same. That is, for a field with zones that have a size and shape that remain the same from year to year, the producer may only need to sample the field for average organic matter content within a select number of zones in order to determine the fertilizer needs of the various, yet stable-sized zones within the field. Otherwise, for a field with changing zone areas, the producer may be required to have relatively more soil samples analyzed to determine the fertilization requirements for the agricultural field.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

From the above description and drawings, the advantages of the disclosure will be understood by those of ordinary skill in the art. It will also be understood that the particular implementations shown and described are for purposes of illustration and are not intended to limit the scope of the present invention. Those of ordinary skill in the art will recognize that the present invention may be embodied in other specific forms without departing from its spirit or essential characteristics. References to details of particular embodiments are not intended to limit the scope of the invention. Variations, modifications, additions, and improvements to the disclosure above may fall within the scope of the disclosure as defined in the claims that follow.

The invention claimed is:

1. A computer-implemented method for mapping relative changes in organic matter in an agricultural field, comprising:
   mapping relative changes in organic matter within soil in an agricultural field utilizing at least two individual bands from one or more remotely sensed images of the agricultural field using a processor unit, each of the two individual bands associated with a light spectrum wavelength range, wherein each of the at least two bands is weighted based on a contribution each band provides to predict the relative changes in organic matter;
   using the processor unit to separate the mapped relative changes in organic matter according to geographic zones, each zone defined by weighting pixels of the one or more remotely sensed images according to the predicted organic matter falling within a predefined range of change, and each zone comprising a different range of relative organic matter with respect to an adjacent zone, wherein zone boundaries are defined where a value of the weighted pixels reaches a predefined threshold; and
   using the processor unit to recommend a nutrient supplement for each zone based on the range of organic matter associated with each of the mapped zones; and
   storing the map of the zones of the agricultural field and the recommendation of the nutrient supplement for each zone in a memory unit.

2. The method of claim 1, further comprising using the processor unit to retrieve soil test data for the agricultural field and to determine an average amount of organic matter within one or more of the zones.

3. The method of claim 1, wherein the remotely sensed images of the agricultural field are satellite images of bare soil.

4. The method of claim 1, wherein at least one of the individual bands is associated with a light spectrum wavelength range in the infrared region.

5. The method of claim 1, wherein the predefined range of change used to define one or more of the zones is between a 1 percent to 3 percent range of change in predicted organic matter.

6. The method of claim 1, wherein two of the at least two individual bands are from two different remotely sensed images of the agricultural field.

7. The method of claim 6, wherein two of the at least two individual bands are from the same light spectrum wavelength range.

8. The method of claim 6, wherein two of the at least two individual bands are from different light spectrum wavelength ranges.

9. The method of claim 1, wherein weighted elevation data for the agricultural field is used to map the predicted relative changes in organic matter.

10. The method of claim 1, further comprising displaying a map of the relative changes in organic matter within the agricultural field according to zones generated by the processor unit using a display device.

11. A computer-implemented system for mapping relative organic matter in an agricultural field, comprising:
a processor unit programmed to:
map relative changes in organic matter within soil in an agricultural field utilizing at least two individual bands from one or more remotely sensed images of the agricultural field, the remotely sensed images stored in a memory unit coupled to the processor unit, wherein each of the two individual bands are associated with a light spectrum wavelength range, and wherein each of the at least two bands is weighted based on a contribution each band provides to predict the relative changes in organic matter in the soil;
separate the mapped relative changes in organic matter according to geographic zones, each zone defined by weighting pixels of the one or more remotely sensed images according to the predicted organic matter content falling within a predefined range of change, and each zone comprising a different relative organic matter with respect to an adjacent zone wherein zone boundaries are defined where a value of the weighted pixels reaches a predefined threshold; and
recommend a nutrient supplement for each zone based on the relative organic matter content associated with each of the zones; and
a memory unit for storing the map of the zones of the agricultural field and the recommendation of the organic matter supplement for each zone.

12. The system of claim 11, wherein the processor unit is further programmed to retrieve soil test data for the agricultural field and to determine an amount of organic matter within one or more of the zones.

13. The system of claim 11, wherein the remotely sensed images of the agricultural field are satellite images of bare soil.

14. The System of claim 11, Wherein at Least One of the Individual Bands is associated with a light spectrum wavelength range in the infrared region.

15. The system of claim 11, wherein the predefined range of change used to define one or more of the zones is between a 1 percent to 3 percent range of change in predicted organic matter.

16. The system of claim 11, wherein two of the at least two individual bands are from two different remotely sensed images of the agricultural field.

17. The system of claim 16, wherein two of the at least two individual bands are from the same light spectrum wavelength range.

18. The system of claim 16, wherein two of the at least two individual bands are from different light spectrum wavelength ranges.

19. The system of claim 11, wherein weighted elevation data for the agricultural field is used to map the predicted relative changes in organic matter.

20. A computer-implemented method for mapping relative organic matter in an agricultural field, comprising:
mapping changes in relative organic matter within an agricultural field utilizing at least one band from one or more remotely sensed images of the agricultural field and an elevation change of the agricultural field using a computer processor, each band associated with a light spectrum wavelength range, wherein each band used in the calculation and the elevation change of the agricultural field is weighted based on a contribution each of the band and the elevation change provides to predict a change in organic matter content;
using the computer processor to separate the relative change in organic matter within the agricultural field according to geographic zones, each zone defined by weighting pixels of the one or more remotely sensed images based on the a predefined range of relative organic matter within the zone, and each zone comprising a different relative organic matter content with respect to an adjacent zone, wherein zone boundaries are predicted using one or more elevation changes, and wherein the zone boundaries are defined where a value of the weighted pixels reaches a predefined threshold; and
using the computer processor to recommend a nutrient supplement for each zone based on the relative organic matter content associated with each of the zones.

21. The method of claim 1, wherein the one or more remotely sensed images includes one or more historical remotely sensed images and one or more current remotely sensed images.

22. The method of claim 21, wherein bands used in the one or more historical remotely sensed images are different than the bands used in the one or more current remotely sensed images.

23. The method of claim 1, further comprising using the processor unit to calculate zone boundary predictions based on slope change data before calculating the zones.

* * * * *